Dec. 18, 1951 — A. M. GEORGESON — 2,578,971
AUTOMATIC ELECTRIC BREAD TOASTER
Filed Feb. 16, 1951 — 3 Sheets-Sheet 1
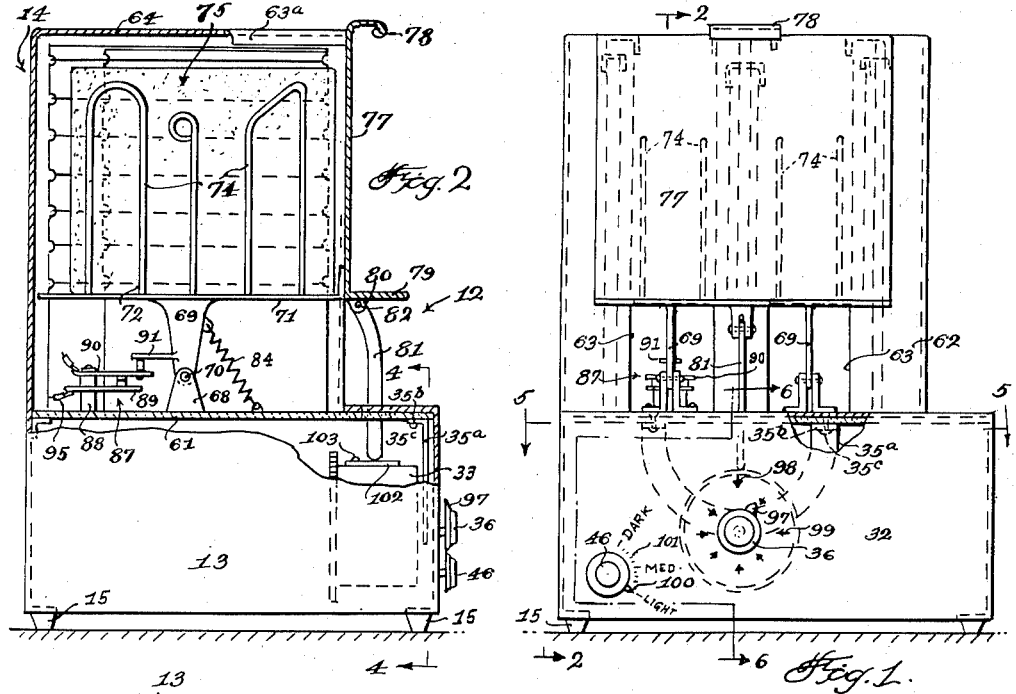
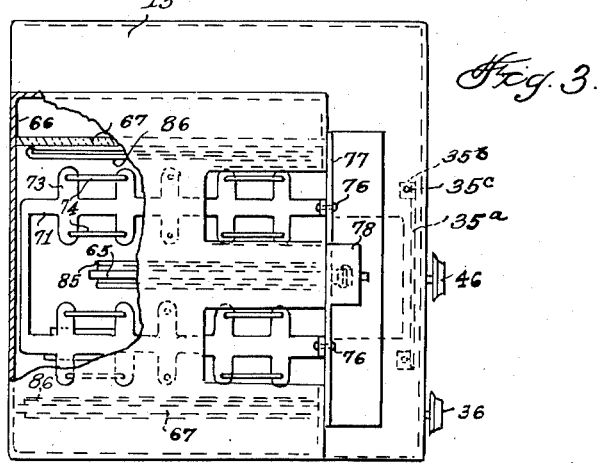
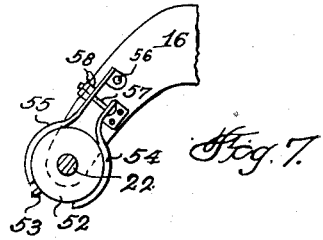
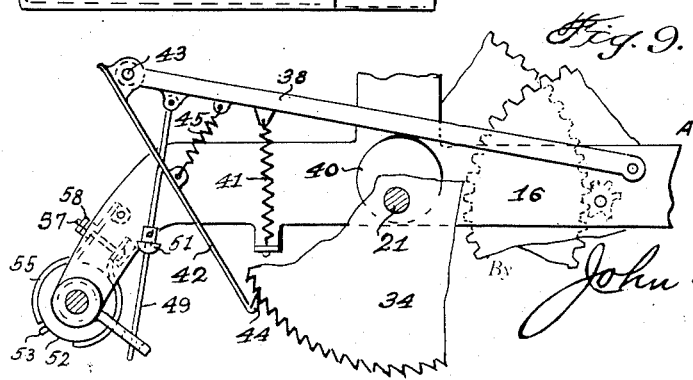
Inventor
ALBIN M. GEORGESON
By John N. Randolph
Attorney

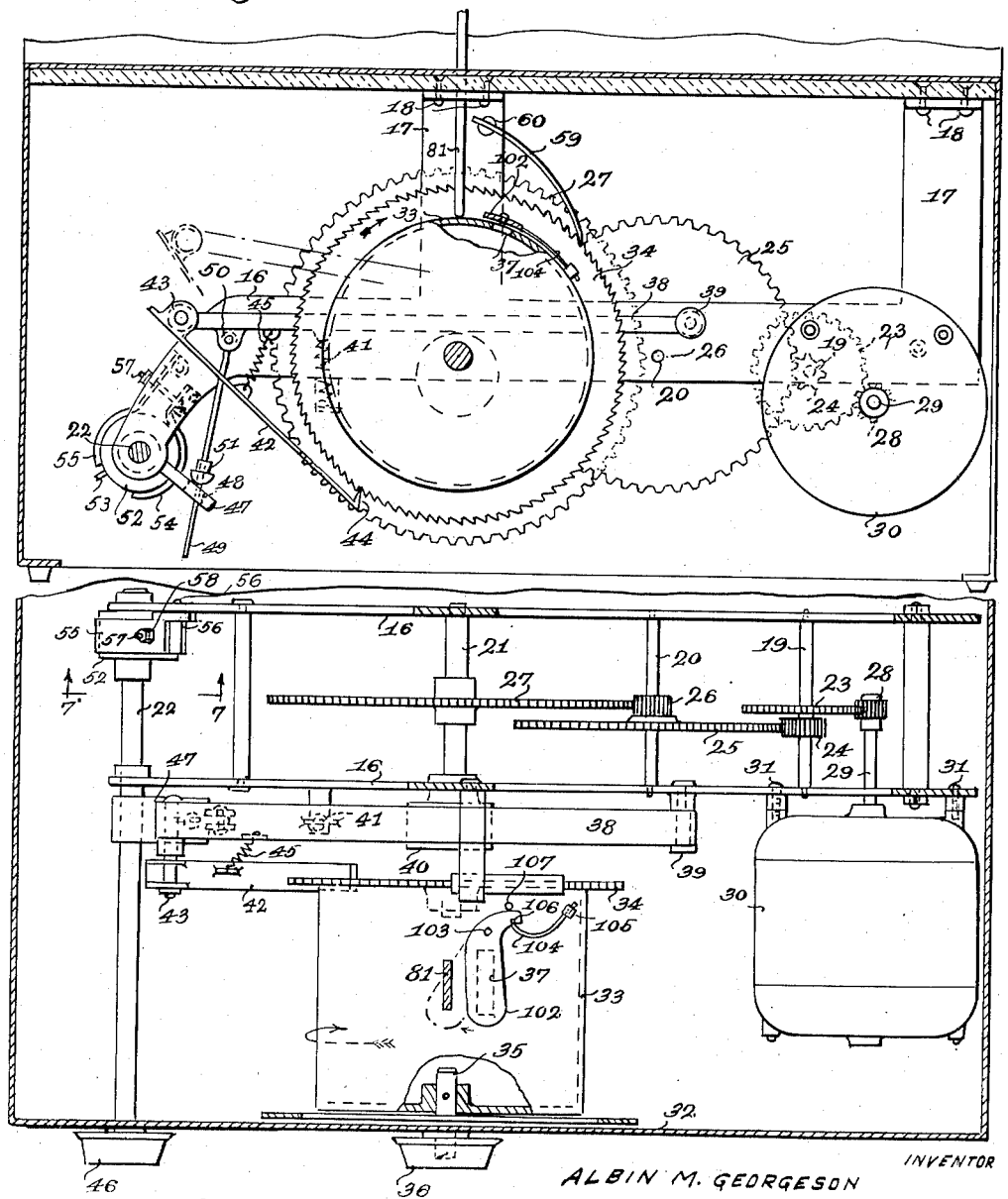

Dec. 18, 1951  A. M. GEORGESON  2,578,971
AUTOMATIC ELECTRIC BREAD TOASTER
Filed Feb. 16, 1951  3 Sheets-Sheet 3
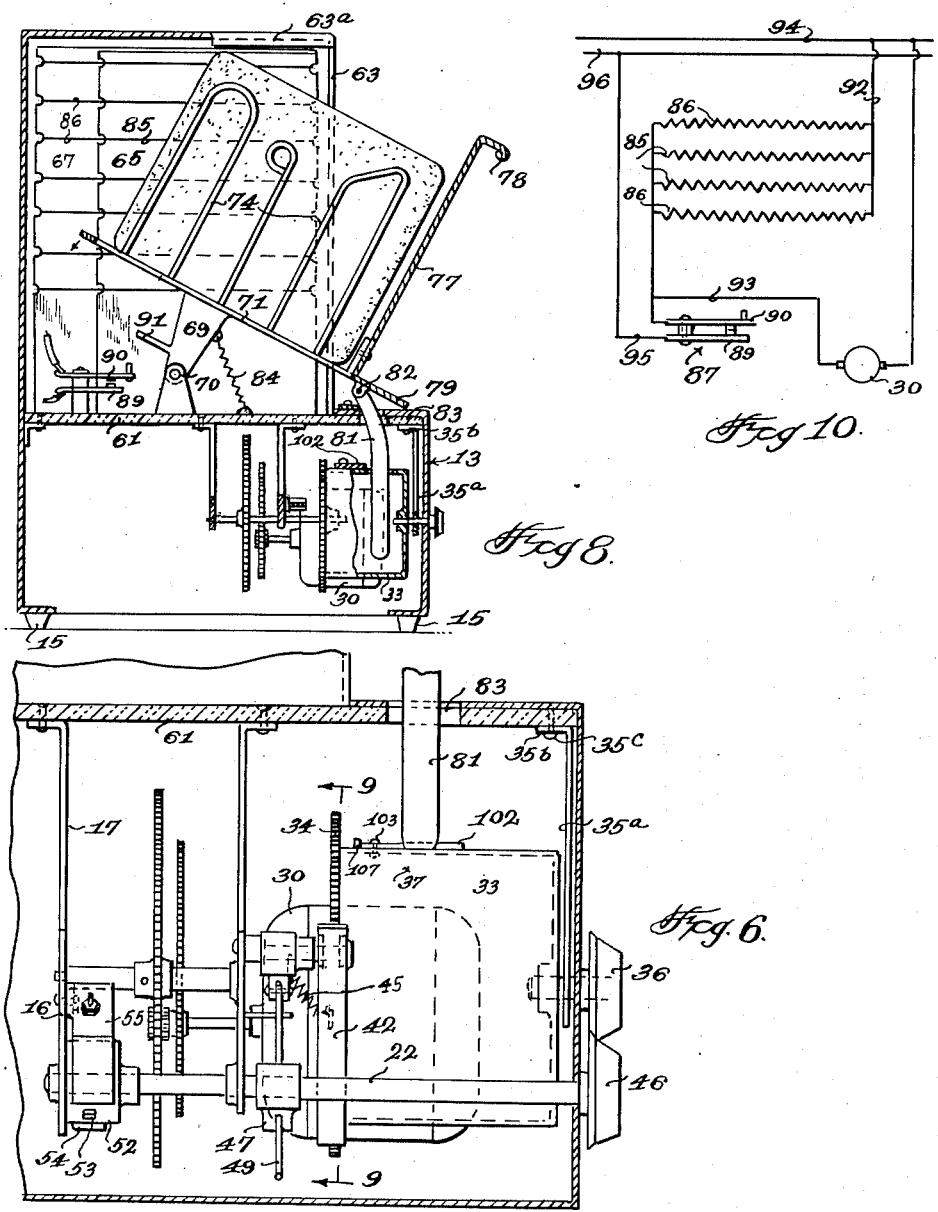

Patented Dec. 18, 1951

2,578,971

UNITED STATES PATENT OFFICE 2,578,971

AUTOMATIC ELECTRIC BREAD TOASTER

Albin M. Georgeson, Esmond, N. Dak., assignor of one-third to Leo F. Eberle and one-third to Paul Vetter, both of Esmond, N. Dak.

Application February 16, 1951, Serial No. 211,287

10 Claims. (Cl. 99—327)

This invention relates to an improved construction of bread toaster of relatively simple construction having gravity actuated means for moving toasted slices of bread to a position to be removed from the toaster and for simultaneously de-energizing the electrically actuated parts of the toaster and the electrically energized heating elements thereof.

Another object of the invention is to provide a toaster wherein the setting of the toaster can be quickly changed and regulated for partially re-toasting insufficiently toasted bread slices or for re-heating without burning previously toasted slices of bread.

A further object of the invention is to provide a toaster including a casing having a restricted exposed opening when the toaster is in operation so that a greater portion of the heat from the heating elements will be maintained within the toaster.

Another object of the invention is to provide a toaster which readily adapts itself to be constructed in various sizes for accommodating and simultaneously toasting any desired number of slices of bread and which may be accomplished without otherwise modifying, enlarging or otherwise changing the automatic features and operating structure of the toaster.

Various other objects and advantages of the invention will hereinafter become more fully apparent from the following description of the drawings, illustrating a presently preferred embodiment thereof, and wherein:

Figure 1 is a front elevational view showing the toaster in an operative position;

Figure 2 is a vertical sectional view, partly in side elevation thereof;

Figure 3 is a top plan view partly in horizontal section of the same;

Figure 4 is an enlarged fragmentary vertical sectional view taken substantially along a plane as indicated by the line 4—4 of Figure 2;

Figure 5 is an enlarged horizontal sectional view taken substantially along a plane as indicated by the line 5—5 of Figure 1;

Figure 6 is a transverse vertical sectional view taken substantially along a plane as indicated by the line 6—6 of Figure 1;

Figure 7 is an enlarged fragmentary vertical sectional view taken substantially along a plane as indicated by the line 7—7 of Figure 5;

Figure 8 is a vertical sectional view similar to Figure 2 showing the toaster in an inoperative or "off" position;

Figure 9 is a fragmentary sectional view taken substantially along a plane as indicated by the line 9—9 of Figure 6 illustrating a part of the transmission mechanism in a different position of its movement from the relative positions of the parts as illustrated in Figure 4 and wherein certain of the parts are broken away to illustrate details, and Figure 10 is a diagrammatic view of the electric circuit of the toaster.

Referring more specifically to the drawings, the improved toaster in its entirety is designated generally 12 and includes a housing composed of a bottom section 13 and a top section 14. The bottom section 13 may be provided with an open bottom, as illustrated in Figure 8, to afford access to the mechanism disposed within the section 13 and which open bottom may be supported in elevated position by depending foot members 15.

A bearing frame 16 is suspended in the section 13 by integral hangers 17 which are fastened at 18 to the top wall of the section 13. Four shafts 19, 20, 21 and 22 are journaled in the bearing frame 16. The shafts 19 and 20 each have a large gear and a pinion fixed thereto including a gear 23 and pinion 24 on the shaft 19 and a gear 25 and pinion 26 on the shaft 20. The gear 25 meshes with the pinion 24 and the gear 23 meshes with a pinion 28 fixed to an armature shaft 29 of a small electric motor 30. The electric motor 30 is secured by fastenings 31 to the frame 16. A large gear 27 of the shaft 21 meshes with the pinion 20 so that said pinions and gears form a gear train for driving the shaft 21 at a reduced speed relatively to the armature shaft 29. One end of the shaft 21, disposed between the frame 16 and front wall 32 of the casing section 13, is journaled in one end of a drum 33. An enlarged ratchet wheel is likewise fixed to said end of the drum 33 and is of a larger diameter than the drum, as illustrated at 34. A short stub shaft 35 is fixed to the opposite end of the drum 33 and extends through the front wall 32 and is provided with a turning knob 36 which is disposed outwardly of the wall 32. A U-shaped bearing 35a is disposed between the front wall 32 and the adjacent end of the drum 33 and has angular ends 35b disposed against the underside of a bottom wall 61 of the top section 14. Fastenings 35c extend through the ends 35b and into the wall 61 to secure bearing 35a thereto. Shaft 35 is journaled in the intermediate portion of the bearing 35a. The periphery of the drum 33 is provided with a longitudinally elongated slot 37 for a purpose which will hereinafter become apparent.

A beam 38 is disposed longitudinally of the frame 16 between said frame and the ratchet wheel 34 and is pivotally supported at one of its ends by a pivot pin 39 anchored to the frame 16 for vertical swinging movement. The beam 38 extends over the shaft 21 and is disposed directly above and rests upon a disk 40 which is eccentrically fixed to the shaft 21 to form a cam for swinging the beam 38 upwardly on its pivot 39 at each revolution of the shaft 21. A spring 41 is anchored at its upper end to the lever 38 and at its lower end to the frame 16 for urging the beam 38 downwardly and to retain its intermediate portion in engagement with the periphery of the cam 40. A pawl 42 is pivotally connected adjacent one of its ends to the free end of the beam 38 by a pivot pin 43 and is disposed in offset relationship to the beam 38 and in alignment with the ratchet wheel 34. The pawl 42 has a hook portion 44 at its free end which is disposed at an acute angle to its longitudinal axis and substantially parallel to the teeth of the ratchet wheel 34, disposed adjacent thereto, all of which teeth are inclined in the same direction. Said pawl end 44 is urged toward the ratchet wheel 34 and into engagement between two of the teeth thereof by a contractile spring 45, as best seen in Figures 4 and 9.

The shaft 22 extends through and is journaled in the front wall 32 and has a knob 46 fixed to its outer end and disposed outwardly of the wall 32. The shaft 22 is disposed substantially below the level of the beam 38, in its lowermost position and slightly beyond the free end of said beam. An arm 47 is fixed to and projects radially from the shaft 22 below the beam 38 and is provided with a relatively large opening 48 adjacent its free end for slidably receiving a rod 49 which extends therethrough and which is pivotally connected at 50 at its upper end to the beam 38. A stop 51 is adjustably secured to the rod 49 above the arm 47 and is larger than the opening 48 so that when the stop is in engagement with the upper side of the arm 47 the beam 38 is prevented from swinging downwardly. Accordingly, if the arm 47 is swung upwardly from its position of Figure 4 the beam 38 will be held in a partially elevated position out of engagement with the cam 40 when said cam is in its bottom, dead center position, as illustrated in Figure 4.

As best illustrated in Figures 4, 5 and 7, a disk or drum 52 is fixed to a portion of the shaft 22 and has a stop pin 53 projecting from a portion of its periphery. A stationary gripping strip 54 is fixedly secured at one end to a part of the frame 16 and yieldably engages around a portion of the periphery of the drum 52. A second gripping strip 55 is pivotally mounted at one of its ends 56 on a part of the frame 16 and engages around a portion of the periphery of the drum 52 disposed opposite to the portion thereof engaged by the strip 54. A threaded bolt 57 is connected to and projects from the anchored end of the strip 54 loosely through the strip 55, adjacent to but spaced from its pivoted end 56 and carries jam nuts 58 which engage the outer side of the strip 55 and which are adjustable for drawing said strip 55 into clamping engagement with the drum 52 so that the strips 54 and 55 form with the drum 52 an adjustable brake for frictionally resisting rotation of the shaft 22 to retain the arm 47 in any adjusted position to which it is moved by a manual turning of the knob 46. Likewise, the stop pin 53 is limited in its movement between the free ends of the strips 54 and 55 to limit the extent that the shaft 22 can be turned which, as shown, is through an arc of less than 90°.

From the foregoing it will be obvious that when the cam 40 swings upwardly from its bottom, dead center position of Figure 4 to its top position of Figure 9 that the beam 38 will be swung upwardly on its pivot 39. Accordingly, the pawl 42 will also move upwardly and as its end 44 is in engagement between two of the teeth of the ratchet wheel 34, said ratchet wheel and the drum 33 will turn as a unit in a clockwise direction as seen in Figure 4. After the cam 40 passes its top dead center position of Figure 9 and in moving back to its bottom dead center position of Figure 4, the beam 38 will be urged downwardly by gravity and by the spring 41 from its position of Figure 9 back to its position of Figure 4 or as near to its position of Figure 4 at it is permitted to move by the stop 51 and arm 47. During this downward movement of the beam 38 and pawl 42, the pawl end 44 will yield outwardly of the ratchet wheel 34 and beam 38 against the action of its spring 45 so as to ride over the back sides of the ratchet wheel teeth. To prevent the ratchet wheel and drum from turning in the opposite direction or counterclockwise as the pawl end 44 is riding downwardly over the ratchet wheel teeth, a holding pawl 59 is provided. The holding pawl 59 comprises an elongated leaf spring which is longitudinally bowed and which has one end anchored in a post 60 which projects horizontally from one of the hangers 17. The free end of the pawl 59 is spring biased into engagement between two of the ratchet whel teeth and is disposed to ride over the back sides of said teeth when the ratchet wheel is turned clockwise, as seen in Figure 4, and to engage and prevent the ratchet wheel from being rotated in the opposite direction or counterclockwise.

The upper casing section 14 is supported directly upon the lower casing section 13 and its bottom wall 61 preferably constitutes the top wall of the bottom section 13. However, as illustrated in Figures 1 and 2, the upper casing section 14 is of a length and width less than the section 13 although as the description proceeds it will be apparent that the casing 14 may be made in different lengths and may be longer than the casing section 13 for accommodating and simultaneously toasting three or more slices of bread. The casing section 14 is shown constructed to simultaneously accommodate and toast two slices of bread and has a front wall 62 provided with corresponding slots 63 which extend from top to bottom thereof. Each of the two slots 63 has a portion 63a extending inwardly a short distance of the casing top wall 64 from the front wall 62. A heating element supporting partition or panel 65, as best seen in Figure 3, is disposed in an upright position in the section 14 and is secured to the front wall 62 between the slots 63 and extends toward but terminates in spaced relationship to the rear wall 66 of the section 14. A pair of corresponding partitions 67 are disposed in the section 14 in upright positions and substantially parallel to the partition 65 and each extends between and is secured to the front and rear walls 62 and 66. The partitions 67 are disposed beyond the remote edges of the slots 63.

Pairs of brackets 68 are secured to and rise from the bottom wall 61 between the partitions 67 and the partition 65. A supporting standard 69 is pivotally connected at its lower end by pivot pins 70 to each pair of brackets 68. The standards 69 are secured to and depend perpendicularly from the base or bottom 71 of a bread slice support, designated generally 72. The slice support base or bottom 71, as best illustrated in Figure 3, is substantially U-shaped and has its intermediate portion normally disposed adjacent the inner face of the rear wall 66 and has two legs extending forwardly therefrom between the partitions 67 and the partition 65 through the slots 63. Each of the parallel legs of the bottom 71 is provided with a series of longitudinally spaced transverse projections 73 which are disposed in transversely aligned pairs. A plurality of rods or wire strands are secured to and rise from the ends of the extensions 73, certain of these strands or rods being connected to two of the extensions 73 which are disposed in longitudinal alignment. Said rods or strands form upstanding grills 74 which are disposed substantially parallel to the partitions 65 and 67 and one of which grills is disposed on either side of each parallel leg of the bottom 71 so that said legs and their extensions 73 each combine with a pair of the grills 74 to support a slice of toast 75 upon each leg of the bottom 71 and between the upstanding grills 74 thereof so that the two slices of toast 75 are disposed between and adjacent the partitions 67 and one on either side of the partition 65. The terminals of the legs of the bottom 71 which project through the slots 63 are secured by fastenings 76 to a closure plate 77 which closes the upper portions of the slots 63 when the slice support 72 is in its normal, operative position of Figures 1, 2 and 3. The plate 77 forms a part of the support 72 and is provided with a handle 78 at its upper end and an outturned flange 79 at its bottom edge. A pair of ears 80 depend from the flange 79 to receive therebetween the upper end of a bar 81 which is pivotally connected to the ears by a pin 82. The bar 81 has a substantially straight depending lower end portion and an arcuately curved upper portion. The lower portion of the bar 81 extends loosely through a slot 83 in the horizontal wall 61, which is disposed forwardly of the casing 14 and the rounded lower end of said bar 81 rests upon the drum 33 in circumferential alignment with its slot 37 for supporting the slice support 72 in its operative upright position within the casing 14, as best illustrated in Figure 2. The slot 37 is of sufficient length so that at each revolution of the drum 33 the bar 81 will move into registry with the slot 37 so that its lower portion will drop therethrough, as illustrated in Figure 8, thereby allowing the support 72 to rock clockwise about its pivots 70 from its position of Figure 2 to its inclined open position of Figure 8. The support 72 in its open position is supported by the flange 79 resting upon a portion of the horizontal wall 61 and when thus disposed slices of toast 75 may be removed from between the grills 74 through the slots 63 and 63a and slices of bread may be inserted through said slots into the positions as seen in Figure 8, after which the handle 78 is engaged to return the support 72 to its upright position of Figure 2 and the knob 36 is then turned sufficiently in a clockwise direction, as seen in Figure 1, to move the slot 37 out of registry with the lower end of the bar 81 so that the bar and drum will again support the unit 72 in its position of Figure 2. As seen in Figures 2 and 8, the pivots 70 are disposed nearer the inner than the outer end of the support 72 so that said support will normally swing by gravity to its open position of Figure 8. However, a contractile spring 84 may also be provided for yieldably urging the support 72 to an open position.

Corresponding resistance elements 85 are suitably connected to opposite sides of the partition 65 and corresponding electrical resistance or heating elements 86 are suitably connected to the adjacent sides of the partitions 67 so that the adjacently disposed heating elements 85 and 86 will toast the opposite sides of the two bread slices 75 which are supported therebetween. It will be understood that the partitions 65 and 67 are each formed of a heat resistant electrical insulating material. An electric switch 87 is supported in the casing section 14 by a post 88 which rises from the wall 61 and includes a bottom stationary switch contact 89 and an upper movable switch contact 90 which is normally spring biased to a circuit interrupting position and which has an upstanding free end portion disposed to be engaged by an arm 91 which projects transversely from one standard 69 when the support 72 is in its upright, closed position of Figure 2 for maintaining the switch 87 in a circuit closing position. When the support 72 is swung to its open position of Figure 8 the arm 91 is disengaged from the movable switch element 90, allowing it to assume a circuit interrupting position but engages and returns said element to a circuit closing position when the support is returned to its position of Figure 2. The arm 91 or the end of the switch element 90, engaged by said arm, is formed of electrical insulating material. The switch 87 and resistance elements 85 and 86 are all connected in an electric circuit with the motor 30 so that when the switch 87 is closed the motor 30 and resistance elements 85 and 86 are energized. Figure 10 diagrammatically illustrates an appropriate electric circuit for these parts wherein branch conductors 92 and 93 having the resistance elements and electric motor, respectively, interposed therein lead from a positive electrical conductor 94 and are connected to the movable switch element 90 and a conductor 95 connects the switch element 89 to a negative conductor 96. The knob 36 is provided with a pointer 97 aligned with its slot 37 and the front wall 32 is provided with indicia 98 indicating the location of the bar 81 and may be provided with additional indicia 99 circumferentially spaced around the knob 36 for indicating spaced points to which the knob pointer 97 can be positioned for allowing the slices 75 to be toasted different periods of time. The toasting period may also be varied by turning the knob 43 to position its pointer 100 over the various indicia 101 on the wall 32 for "light" toast, "medium" toast, or "dark" toast, as illustrated in Figure 1 and which is accomplished by the shaft 22 thus being rotated to swing the arm 47 upwardly or downwardly to vary the swinging movement of the beam 38 and the extent of travel of the pawl 42 over the ratchet wheel teeth so that the intermittent strokes of the pawl and beam will be varied to thus vary the time required for these parts to turn the ratchet wheel 34 and drum 33 a complete revolution. A quicker and less accurate adjustment may be made by turning the knob 36 clockwise as seen in Figure 1 to vary the distance of travel of the pointer 97 until it aligns with the indicia 98. However, with the pointer 100 in its position of Figure 1 and the pointer 97 adjusted to the right or clockwise of the indicator 98 the bread slices 75 will be lightly toasted and if the knob 46 is turned to move the pointer 100 upwardly the bread will be toasted longer to provide medium or dark toast. Frequently, the initial toasting of the slices upon commencement of use of the toaster will be too light due to lack of pre-heating of the resistance elements and the slices 75 may then be partially re-toasted by turning the knob 36 clockwise to position the slot 64 in alignment with one of the indicia 99 so that a partial re-toasting of the two slices may be accomplished without burning the bread.

As previously described, with the slices of bread 75 in the support 72 with the latter positioned as illustrated in Figure 2 and the slot 37 moved clockwise past the bar 81, the electric circuit of Figure 10 will be energized to drive the motor 30 and energize the heating elements 85 and 86. The motor 30 may turn its armature shaft in either direction and through the reduction gearing 23–28 will drive the shaft 21 at a greatly reduced speed relatively to the armature shaft 29. The shaft 21 drives the cam 40 for intermittently elevating the beam 38 so that the pawl 42 will turn the ratchet wheel 34 and drum 33 clockwise as seen in Figure 4, until the slot 37 is positioned to receive the bar 81 to permit the support 72 to swing to its open position of Figure 8. When this occurs the circuit is de-energized by the opening of the switch 87 to de-energize the heating elements and motor 30 which parts are automatically re-energized, as previously described, when the support 72 is returned to its position of Figure 2.

To avoid the necessity of turning the knob 36 clockwise to displace the slot 37 out of alignment with the bar 81 so that the drum 33 can maintain the support 72 in an upright position, a closure plate 102 is mounted on the outer side of the drum and is connected thereto by a pivot pin 103, as best seen in Figure 5. A leaf spring 104 is anchored at one end at 105 to the periphery of the drum 33 and has a free end engaging in a notch 106 which is located adjacent one end of the closure plate 102 and on the opposite side of the pivot 103 to the plate portion which is normally disposed over the slot 37. The spring 104 urges the plate or closure 102 to swing counterclockwise on its pivot 103. A pin 107 forming a stop projects from the periphery of the drum 33 and is disposed to be engaged by a portion of the closure 102 when it is disposed in its position of Figure 5 over the slot 37 to limit further counterclockwise swinging movement of the closure under the biasing action of the spring 104. Accordingly, it will be readily apparent that when the support is swung to its upright position of Figure 2 to disengage the lower end of the bar 81 from the slot 37, the closure plate 102 will assume its full line position of Figure 5 so that the lower end of the bar 81 may rest there upon to maintain the support 72 in its upright position of Figure 2. Thus, the knob 36 will not have to be turned clockwise to move the slot 37 out of alignment with the bar 81 and an accurate toasting of the bread slices will be accomplished and which may be varied merely by adjustment of the knob 46, as previously described. It will be apparent that as the drum 33 commences to turn clockwise as seen in Figure 4 after the support 72 has been moved to its upright closed position of Figure 2, that the lower end of the arm 81 will ride transversely across and off of the closure 102 as said closure moves with the drum from left to right, as seen in Figure 5. Thereafter the lower end of the bar 81 will ride the periphery of the drum 33 until the drum has approached a complete revolution at which time the right-hand or leading edge of the plate 102 will move into engagement with the bar 81. Further clockwise movement of the drum in a direction from left to right of Figure 5 will then result in the closure plate 102 being swung clockwise on its pivot 103 to its dotted line position of Figure 5 by its engagement with the bar 81 to thus dispose the slot 37 to allow the bar to drop through the slot into the drum 33, as illustrated in Figure 8 so that the support 72 can assume its open position and the electrically energized parts will be de-energized.

It will be readily apparent that the casing 14 may be made of any desired length and that the support 72 may be provided with a base 71 having any number of parallel legs each equipped with a pair of grills 74. Similarly, the casing may be provided with any number of slots 63 and 63a and any additional number of partitions 65 and pairs of heating elements 85 interposed between the heating elements 86 for simultaneously toasting three or more slices of bread in the same manner as previously described for the two slice toaster as illustrated.

Various other modifications and changes are contemplated and may obviously be resorted to, without departing from the spirit or scope of the invention as hereinafter defined by the appended claims.

I claim as my invention:

1. An automatic bread slice toaster comprising a casing having an upper section, a plurality of spaced electric heating elements disposed in said upper section, a bread support having means for supporting a plurality of slices of bread in upright positions within said upper section between heating elements thereof to be toasted thereby, means pivotally supporting said bread support for vertical swinging movement between an upright position within the upper section and an inclined position partially outwardly of said upper section, said upper section having slots through which portions of the support are swingable between the upright and inclined positions of the support and through which the slices are insertable into or removable from the support when the latter is in an inclined position, a bottom casing section disposed beneath and supporting the top casing section, an electrically driven rotary cam journaled in the bottom casing section, pawl and ratchet means intermittently actuated by said cam including a ratchet wheel rotated in one direction intermittently by oscillating motion of a pawl actuated by said cam, a member having a cylindrical portion fixed to the ratchet wheel and rotatable therewith, said cylindrical portion having a slot, and a bar pivotally connected at its upper end to the slice support having a lower end engaging on said cylindrical portion for maintaining the slice support in an upright position within the top casing section, said slot being movable into a position to receive the lower end of the bar during each complete revolution of said member, and said slice support being gravity actuated for movement to an inclined, open position when the bar registers with and enters said slot.

2. A toaster as in claim 1, and manually actuated means connected to said member for rotating the member in one direction to position the slot thereof at different distances from the supporting bar to vary the extent of travel of the ratchet wheel required to move the slot into registration with said bar.

3. A toaster as in claim 2, and adjustable means associated with the pawl for varying the extent of movement of the pawl when actuated by said cam to thereby vary the extent of travel of the ratchet wheel for each revolution of the cam and the length of time required for the ratchet wheel to complete one revolution of its travel.

4. A toaster as in claim 1, an electric circuit connected to the heating elements and to the electrical driving means of the cam, a normally open switch interposed in said circuit, and means carried by the slice support for engaging and holding the switch in a circuit closing position when said support is disposed in an upright position and for releasing the switch to move to a circuit interrupting position when said support is swung to its inclined, open position.

5. A toaster as in claim 1, a beam pivotally mounted in said bottom casing section having a portion disposed above and engaged by said cam whereby said beam is rocked vertically by the cam and by gravity, the pawl of said pawl and ratchet means being pivotally connected to one end of the beam, and a manually adjustable stop for regulating the downward swinging movement of said beam and pawl including a part connected to the beam and a part manually movable toward and away from the beam and slidably receiving said first mentioned part for varying the stroke of the pawl for varying the number of revolutions of the cam relatively to the ratchet wheel.

6. A toaster as in claim 1, a beam pivotally mounted in said bottom casing section having a portion disposed above and engaged by said cam whereby said beam is rocked vertically by the cam and by gravity, the pawl of said pawl and ratchet means being pivotally connected to one end of the beam, and a manually adjustable stop for regulating the downward swinging movement of the said beam and pawl including a part connected to the beam and a part manually movable toward and away from the beam and slidably receiving said first mentioned part for varying the stroke of the pawl for varying the number of revolutions of the cam relatively to the ratchet wheel, and adjustable gripping means for retaining the last mentioned part of said adjustable stop in various adjusted positions and for limiting the extent of movement of the adjustable part of the stop toward and away from said beam.

7. A toaster as in claim 1, said slice support comprising a bottom including a plurality of spaced substantially parallel arms each disposed between a pair of said heating elements, each of said parallel arms of the slice support having spaced upstanding grills between which the bread slice is adapted to be maintained in an upright position on said arm.

8. A toaster as in claim 1, said slice support comprising a bottom including a plurality of spaced substantially parallel arms each disposed between a pair of said heating elements, each of said parallel arms of the slice support having spaced upstanding grills between which the bread slice is adapted to be maintained in an upright position on said arm, and a plate forming the outer wall of said slice support in which corresponding ends of said parallel arms are secured, said plate being disposed against a wall of the upper casing section.

9. An automatic bread slice toaster as in claim 1, a closure plate pivotally mounted on the outer side of said cylindrical portion, spring means engaging said closure plate and urging it to swing in one direction to a position to close said slot for supporting the bar out of engagement with the slot, said bar engaging the leading edge of the closure plate at each revolution of the cylindrical portion to swing the closure plate against the action of said spring means to a position to expose the slot to receive said bar.

10. An automatic bread slice toaster as in claim 1, a closure plate pivotally mounted on the outer side of said cylindrical portion, spring means engaging said closure plate and urging it to swing in one direction to a position to close said slot for supporting the bar out of engagement with the slot, said bar engaging the leading edge of the closure plate at each revolution of the cylindrical portion to swing the closure plate against the action of said spring means to a position to expose the slot to receive said bar, and stop means limiting the swinging movement of the closure plate under the action of said spring means for normally maintaining the closure plate in a position to close the slot.

ALBIN M. GEORGESON.

No references cited.